United States Patent
Siravara et al.

(10) Patent No.: US 11,481,671 B2
(45) Date of Patent: Oct. 25, 2022

(54) SYSTEM, METHOD, AND COMPUTER PROGRAM PRODUCT FOR VERIFYING INTEGRITY OF MACHINE LEARNING MODELS

(71) Applicant: Visa International Service Association, San Francisco, CA (US)

(72) Inventors: Vishwas Siravara, Austin, TX (US); Peijie Li, Austin, TX (US); Yu Gu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 340 days.

(21) Appl. No.: 16/413,987

(22) Filed: May 16, 2019

(65) Prior Publication Data
US 2020/0364612 A1    Nov. 19, 2020

(51) Int. Cl.
*G06N 20/00*    (2019.01)
*G06F 21/60*    (2013.01)
*G06F 21/64*    (2013.01)

(52) U.S. Cl.
CPC .......... *G06N 20/00* (2019.01); *G06F 21/602* (2013.01); *G06F 21/64* (2013.01)

(58) Field of Classification Search
CPC .................................................... G06N 20/00
USPC ........................................................ 706/12
See application file for complete search history.

(56) References Cited

U.S. PATENT DOCUMENTS

| | | | |
|---|---|---|---|
| 9,996,804 B2 | 6/2018 | Bowers et al. | |
| 10,599,984 B1 * | 3/2020 | Wubbels | G16H 30/40 |
| 2016/0358099 A1 | 12/2016 | Sturlaugson et al. | |
| 2016/0358102 A1 * | 12/2016 | Bowers | G06N 20/00 |
| 2018/0183815 A1 * | 6/2018 | Enfinger | H04L 63/145 |
| 2019/0005411 A1 * | 1/2019 | Eads | G06N 20/20 |
| 2019/0325353 A1 * | 10/2019 | Aftab | G06N 20/00 |
| 2020/0219009 A1 * | 7/2020 | Dao | G06F 21/64 |
| 2020/0320349 A1 * | 10/2020 | Yu | G06K 9/6257 |

(Continued)

FOREIGN PATENT DOCUMENTS

KR    1020160143512 A    12/2016

OTHER PUBLICATIONS

Amershi et al., "ModelTracker: Redesigning Performance Analysis Tools for Machine Learning", CHI 2015, Apr. 18-23, 2015, https://www.microsoft.com/en-us/research/wp-content/uploads/2016/02/amershi.CHI2015.ModelTracker.pdf, 10 pages.

(Continued)

*Primary Examiner* — Ruay Ho
(74) *Attorney, Agent, or Firm* — The Webb Law Firm

(57) ABSTRACT

Provided is a system for verifying integrity of a machine learning model, the system includes at least one processor programmed or configured to determine whether an output of a machine learning model based on an input corresponds to a reference output of the machine learning model based on the input, serialize the machine learning model into a file, calculate a file integrity value of the file using a file integrity detection function, determine whether the file integrity value corresponds to a reference file integrity value of the file, and perform an operation with the machine learning model based on determining that the file integrity value corresponds to the reference file integrity value of the file. A method and computer program product are also disclosed.

9 Claims, 9 Drawing Sheets

(56) References Cited

U.S. PATENT DOCUMENTS

2022/0198562 A1* 6/2022 Celia ..................... G06Q 40/04

OTHER PUBLICATIONS

Sagar, "How Healthy is Your Machine Learning Model?", Analytics India, Feb. 21, 2019, https://www.analyticsindiamag.com/how-healthy-is-your-machine-learning-model/, 3 pages.

* cited by examiner

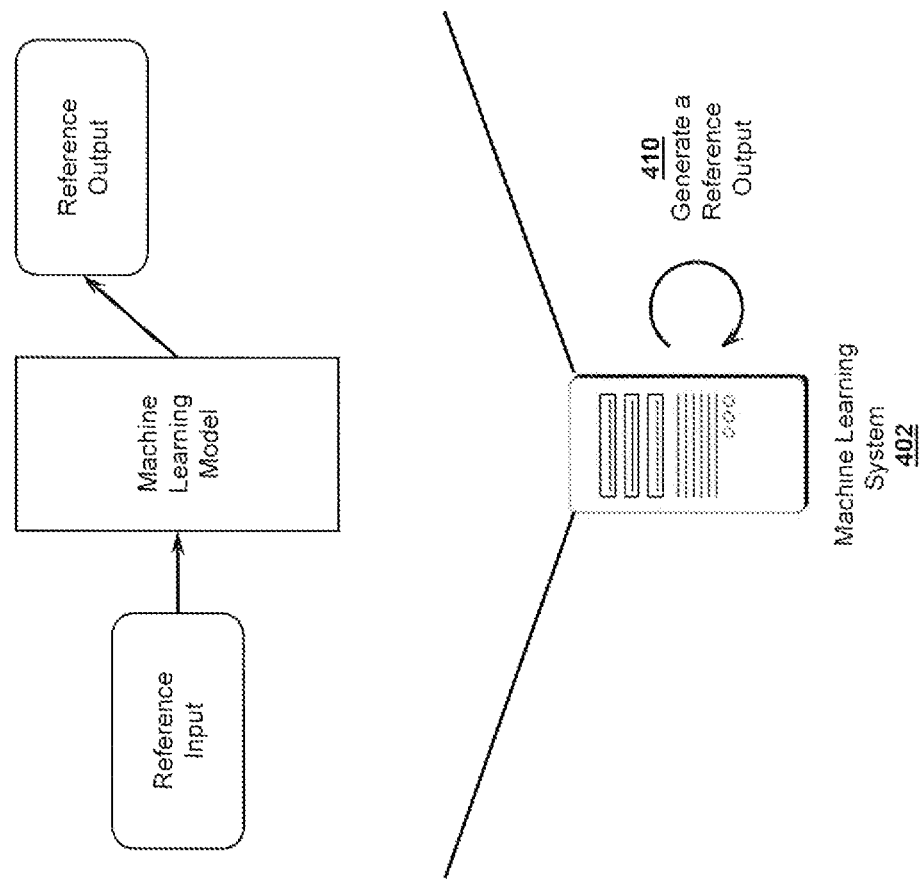

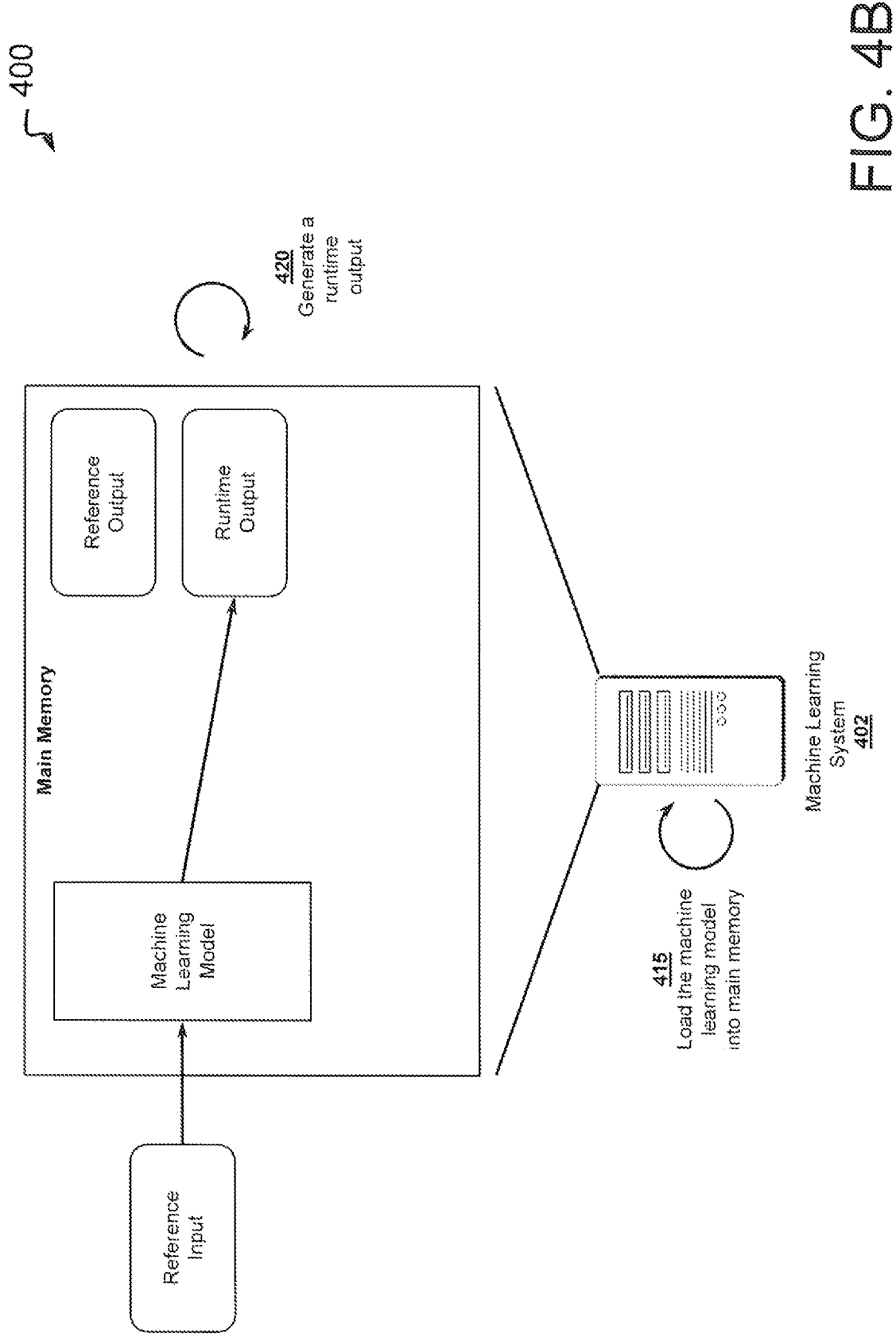

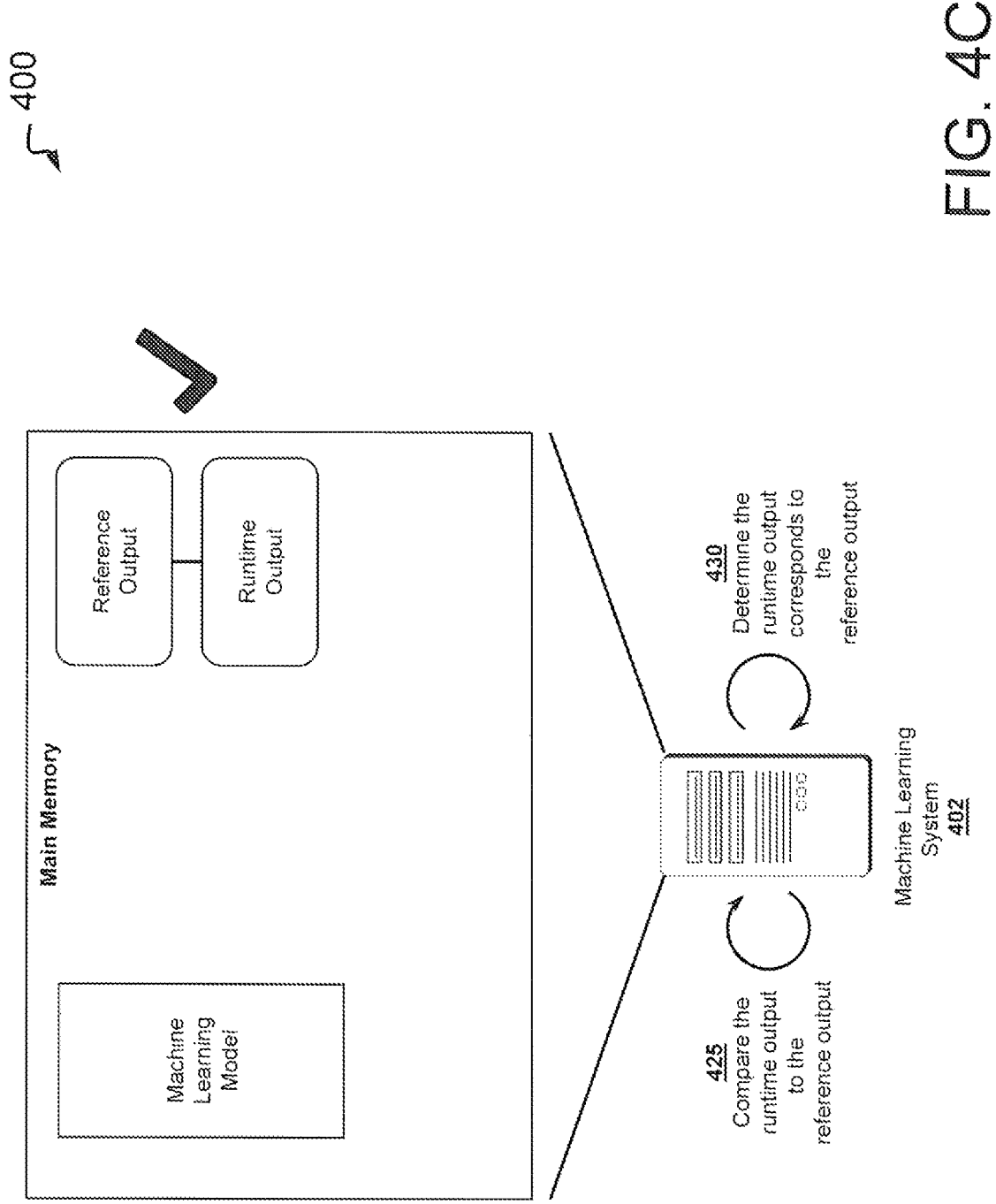

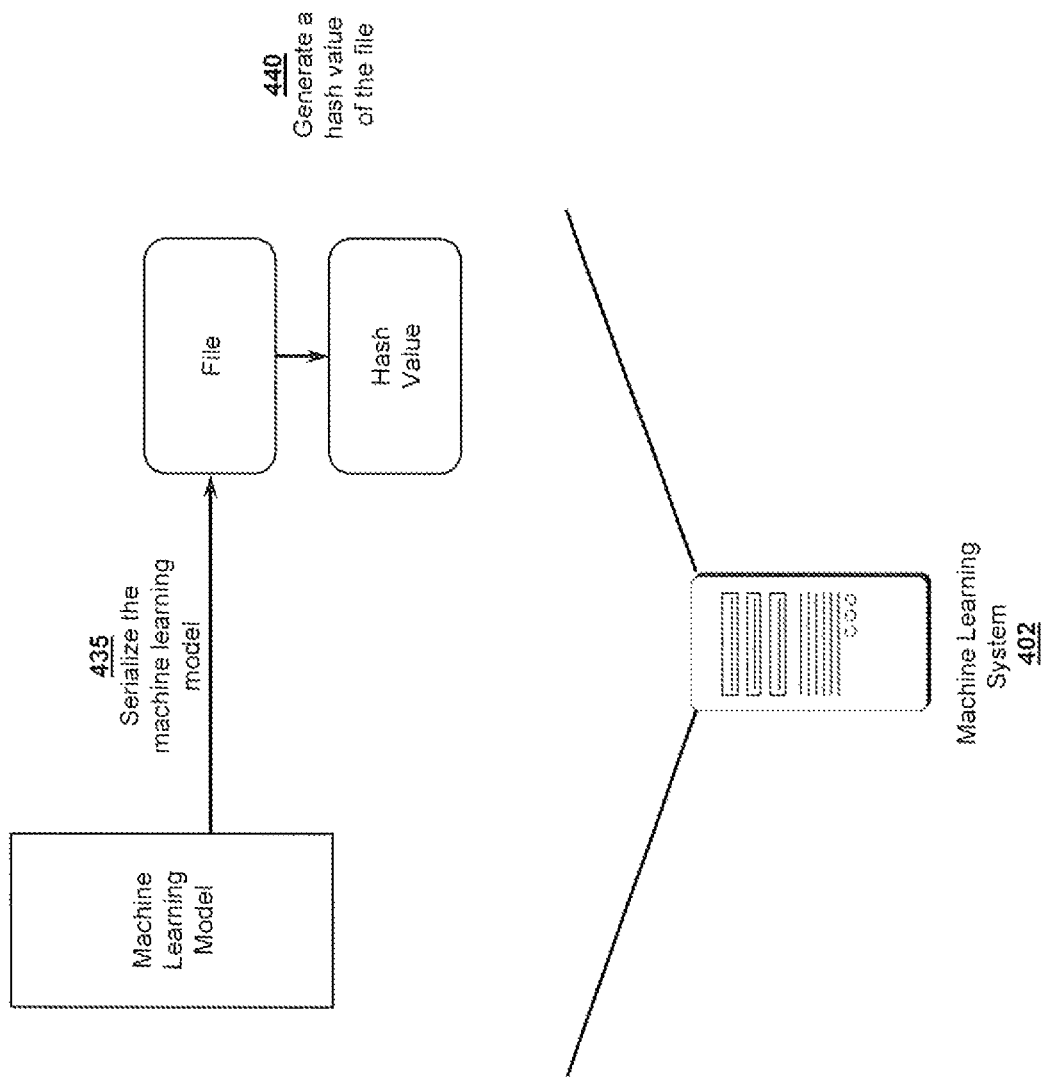

SYSTEM, METHOD, AND COMPUTER PROGRAM PRODUCT FOR VERIFYING INTEGRITY OF MACHINE LEARNING MODELS

BACKGROUND

1. Technical Field

This present disclosure relates generally to systems, devices, computer program products, apparatus, and methods that are used for verifying integrity of machine learning models and, in one particular embodiment, to a system, computer program product, and method for verifying integrity of a machine learning model in real-time.

2. Technical Considerations

Machine learning may be a field of computer science that uses statistical techniques to provide a computer system with the ability to learn (e.g., to progressively improve performance of) a task with data without the computer system being explicitly programmed to perform the task. In some instances, a machine learning model may be developed for a set of data so that the machine learning model may perform a task (e.g., a task associated with a prediction) with regard to the set of data.

A machine learning model may also be used in a computer network to provide an output to devices in the computer network. For example, a machine learning model may be loaded on a server and the server may receive a request from another device in the computer network. The request may be associated with obtaining an output of the machine learning model based on an input included in the request. The server may respond to the request with the output of the machine learning model based on the input.

However, a machine learning model may be corrupted based on a hardware and/or software failure of a computing device (e.g., a server) that stores the machine learning model. In addition, the server may not be able to determine if the machine learning model is corrupt at runtime. For example, the server may not be able to determine if the machine learning model is corrupt when the machine learning model is stored in main memory (e.g., a random access memory (RAM)) of the server. In the event that the machine learning model is corrupt, a response provided by the server based on an output of the machine learning model may include information that is incorrect and can cause further deleterious effects to any system or device that relies on the information.

SUMMARY

Accordingly, systems, devices, computer program products, apparatus, and/or methods for verifying the integrity of a machine learning model are disclosed that overcome some or all of the deficiencies of the prior art.

According to a non-limiting embodiment, provided is a system for verifying integrity of a machine learning model, the system comprising: at least one processor programmed or configured to: determine whether an output of a machine learning model based on an input corresponds to a reference output of the machine learning model based on the input; serialize the machine learning model into a file; calculate a file integrity value of the file using a file integrity detection function; determine whether the file integrity value corresponds to a reference file integrity value of the file; and perform an operation with the machine learning model based on determining that the file integrity value corresponds to the reference file integrity value of the file.

The system wherein the file integrity detection function is a hash function and wherein when calculating the reference file integrity value of the file using the function the at least one processor is programmed or configured to: calculate a hash value of the file using the hash function; and wherein when determining whether the file integrity value corresponds to the reference file integrity value of the file the at least one processor is programmed or configured to: determine whether the hash value of the file corresponds to a reference hash value of the file.

The system wherein the at least one processor is programmed or configured to: load the machine learning model into a main memory before determining whether the output of the machine learning model based on the input corresponds to the reference output of the machine learning model based on the input.

The system wherein the at least one processor is programmed or configured to: generate the reference output of the machine learning model based on the input to the machine learning model; and store the reference output of the machine learning model in a data structure.

The system wherein when serializing the machine learning model into the file the at least one processor is programmed or configured to: serialize the machine learning model into the file based on determining that the output of the machine learning model based on the input corresponds to the reference output of the machine learning model based on the input.

The system wherein the at least one processor is programmed or configured to: use the machine learning model to produce a runtime output based on determining that the file integrity value corresponds to a reference file integrity value of the file.

The system wherein the at least one processor is programmed or configured to: generate the reference file integrity value of the file using the file integrity detection function; and store the reference file integrity value of the file in a data structure.

According to a non-limiting embodiment, provided is a computer-implemented method for verifying integrity of a machine learning model, the method comprising: determining, with at least one processor, that an output of a machine learning model based on an input corresponds to a reference output of the machine learning model based on the input; serializing, with at least one processor, the machine learning model into a file; calculating, with at least one processor, a file integrity value of the file using a file integrity detection function; determining, with at least one processor, that the file integrity value corresponds to a reference file integrity value of the file; and performing, with at least one processor, an operation with the machine learning model based on determining that the file integrity value corresponds to the reference file integrity value of the file.

The computer-implemented method wherein the file integrity detection function is a hash function and wherein calculating, with at least one processor, the reference file integrity value of the file using the function comprises: calculating, with at least one processor, a hash value of the file using the hash function; and wherein determining, with at least one processor, whether the file integrity value corresponds to the reference file integrity value of the file comprises: determining, with at least one processor, whether the hash value of the file corresponds to a reference hash value of the file.

The computer-implemented method further comprising loading the machine learning model into a main memory before determining whether the output of the machine learning model based on the input corresponds to the reference output of the machine learning model based on the input.

The computer-implemented method further comprising: generating, with at least one processor, the reference output of the machine learning model based on the input to the machine learning model; and storing, with at least one processor, the reference output of the machine learning model in a data structure.

The computer-implemented method wherein serializing, with at least one processor, the machine learning model into the file comprises: serializing, with at least one processor, the machine learning model into the file based on determining that the output of the machine learning model based on the input corresponds to the reference output of the machine learning model based on the input.

The computer-implemented method further comprising: using the machine learning model to produce a runtime output based on determining that the file integrity value corresponds to a reference file integrity value of the file.

The computer-implemented method further comprising: generating, with at least one processor, the reference file integrity value of the file using the file integrity detection function; and storing, with at least one processor, the reference file integrity value of the file in a data structure.

According to a non-limiting embodiment, provided is a computer program product for verifying integrity of a machine learning model, the computer program product comprising at least one non-transitory computer-readable medium including one or more instructions that, when executed by at least one processor, cause the at least one processor to: determine whether a runtime output of a machine learning model based on a reference input corresponds to a reference output of the machine learning model based on the reference input; serialize the machine learning model into a file; calculate a file integrity value of the file using a file integrity detection function; determine whether the file integrity value corresponds to a reference file integrity value of the file; and perform an operation with the machine learning model based on determining that the file integrity value corresponds to the reference file integrity value of the file.

The computer program product wherein the file integrity detection function is a hash function and wherein the one or more instructions that cause the at least one processor to calculate the reference file integrity value of the file using the function cause the at least one processor to: calculate a hash value of the file using the hash function; and wherein the one or more instructions that cause the at least one processor to determine whether the file integrity value corresponds to the reference file integrity value of the file cause the at least one processor to: determine whether the hash value of the file corresponds to a reference hash value of the file.

The computer program product wherein the one or more instructions further cause the at least one processor to: load the machine learning model into a main memory.

The computer program product wherein the one or more instructions further cause the at least one processor to: generate the reference output of the machine learning model based on the input to the machine learning model; and store the reference output of the machine learning model in a data structure.

The computer program product wherein the runtime output is a first runtime output, and wherein the one or more instructions further cause the at least one processor to: use the machine learning model to provide a second runtime output based on determining that the file integrity value corresponds to a reference file integrity value of the file.

The computer program product wherein the one or more instructions further cause the at least one processor to: generate the reference file integrity value of the file using the file integrity detection function; and store the reference file integrity value of the file in a data structure.

Clause 1: A system for verifying integrity of a machine learning model, the system comprising: at least one processor programmed or configured to: determine whether an output of a machine learning model based on an input corresponds to a reference output of the machine learning model based on the input; serialize the machine learning model into a file; calculate a file integrity value of the file using a file integrity detection function; determine whether the file integrity value corresponds to a reference file integrity value of the file; and perform an operation with the machine learning model based on determining that the file integrity value corresponds to the reference file integrity value of the file.

Clause 2: The system of clause 1, wherein the file integrity detection function is a hash function and wherein when calculating the reference file integrity value of the file using the function the at least one processor is programmed or configured to: calculate a hash value of the file using the hash function; and wherein when determining whether the file integrity value corresponds to the reference file integrity value of the file the at least one processor is programmed or configured to: determine whether the hash value of the file corresponds to a reference hash value of the file.

Clause 3: The system of clauses 1 or 2, wherein the at least one processor is programmed or configured to: load the machine learning model into a main memory before determining whether the output of the machine learning model based on the input corresponds to the reference output of the machine learning model based on the input.

Clause 4: The system of any of clauses 1-3, wherein the at least one processor is programmed or configured to: generate the reference output of the machine learning model based on the input to the machine learning model; and store the reference output of the machine learning model in a data structure.

Clause 5: The system of any of clauses 1-4, wherein when serializing the machine learning model into the file the at least one processor is programmed or configured to: serialize the machine learning model into the file based on determining that the output of the machine learning model based on the input corresponds to the reference output of the machine learning model based on the input.

Clause 6: The system of any of clauses 1-5, wherein the at least one processor is programmed or configured to: use the machine learning model to produce a runtime output based on determining that the file integrity value corresponds to a reference file integrity value of the file.

Clause 7: The system of any of clauses 1-6, wherein the at least one processor is programmed or configured to: generate the reference file integrity value of the file using the file integrity detection function; and store the reference file integrity value of the file in a data structure.

Clause 8: A computer-implemented method for verifying integrity of a machine learning model, the method comprising: determining, with at least one processor, that an output of a machine learning model based on an input corresponds to a reference output of the machine learning model based on the input; serializing, with at least one processor, the machine learning model into a file; calculating, with at least one processor, a file integrity value of the file using a file integrity detection function; determining, with at least one processor, that the file integrity value corresponds to a reference file integrity value of the file; and performing, with at least one processor, an operation with the machine learning model based on determining that the file integrity value corresponds to the reference file integrity value of the file.

Clause 9: The computer-implemented method of clause 8, wherein the file integrity detection function is a hash function and wherein calculating, with at least one processor, the reference file integrity value of the file using the function comprises: calculating, with at least one processor, a hash value of the file using the hash function; and wherein determining, with at least one processor, whether the file integrity value corresponds to the reference file integrity value of the file comprises: determining, with at least one processor, whether the hash value of the file corresponds to a reference hash value of the file.

Clause 10: The computer-implemented method of clauses 8 or 9, further comprising loading the machine learning model into a main memory before determining whether the output of the machine learning model based on the input corresponds to the reference output of the machine learning model based on the input.

Clause 11: The computer-implemented method of any of clauses 8-10, further comprising: generating, with at least one processor, the reference output of the machine learning model based on the input to the machine learning model; and storing, with at least one processor, the reference output of the machine learning model in a data structure.

Clause 12: The computer-implemented method of any of clauses 8-11, wherein serializing, with at least one processor, the machine learning model into the file comprises: serializing, with at least one processor, the machine learning model into the file based on determining that the output of the machine learning model based on the input corresponds to the reference output of the machine learning model based on the input.

Clause 13: The computer-implemented method of any of clauses 8-12, further comprising: using the machine learning model to produce a runtime output based on determining that the file integrity value corresponds to a reference file integrity value of the file.

Clause 14: The computer-implemented method of any of clauses 8-13, further comprising: generating, with at least one processor, the reference file integrity value of the file using the file integrity detection function; and storing, with at least one processor, the reference file integrity value of the file in a data structure.

Clause 15: A computer program product for verifying integrity of a machine learning model, the computer program product comprising at least one non-transitory computer-readable medium including one or more instructions that, when executed by at least one processor, cause the at least one processor to: determine whether a runtime output of a machine learning model based on a reference input corresponds to a reference output of the machine learning model based on the reference input; serialize the machine learning model into a file; calculate a file integrity value of the file using a file integrity detection function; determine whether the file integrity value corresponds to a reference file integrity value of the file; deserialize the file to provide the machine learning model; and perform an operation with the machine learning model based on determining that the file integrity value corresponds to the reference file integrity value of the file.

Clause 16: The computer program product of clause 15, wherein the file integrity detection function is a hash function and wherein the one or more instructions that cause the at least one processor to calculate the reference file integrity value of the file using the function cause the at least one processor to: calculate a hash value of the file using the hash function; and wherein the one or more instructions that cause the at least one processor to determine whether the file integrity value corresponds to the reference file integrity value of the file cause the at least one processor to: determine whether the hash value of the file corresponds to a reference hash value of the file.

Clause 17: The computer program product of clauses 15 or 16, wherein the one or more instructions further cause the at least one processor to: load the machine learning model into a main memory.

Clause 18: The computer program product of any of clauses 15-17, wherein the one or more instructions further cause the at least one processor to: generate the reference output of the machine learning model based on the input to the machine learning model; and store the reference output of the machine learning model in a data structure.

Clause 19: The computer program product of any of clauses 15-18, wherein the runtime output is a first runtime output, and wherein the one or more instructions further cause the at least one processor to: use the machine learning model to provide a second runtime output based on determining that the file integrity value corresponds to a reference file integrity value of the file.

Clause 20: The computer program product of any of clauses 15-19, wherein the one or more instructions further cause the at least one processor to: generate the reference file integrity value of the file using the file integrity detection function; and store the reference file integrity value of the file in a data structure.

Characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which:

FIGS. 4A-4F are diagrams of a non-limiting embodiment of a process according to an embodiment of the present disclosure.

DETAILED DESCRIPTION

Figure 1:
FIG. 1 is a diagram of a non-limiting embodiment of an environment in which systems, devices, computer program products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the present disclosure as it is oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information and communicates the processed information to the second unit. In some non-limiting embodiments, a message may refer to a packet (e.g., a data packet, a network packet, and/or the like) that includes data.

As used herein, the term "account identifier" may refer to one or more types of identifiers associated with a user account (e.g., an account identifier, a primary account number (PAN), a card number, a payment card number, a token, and/or the like). In some non-limiting embodiments, an issuer may provide an account identifier (e.g., a PAN, a token, and/or the like) to a user that uniquely identifies one or more accounts associated with that user. The account identifier may be embodied on a physical payment device instrument (e.g., a portable payment device, a payment card, a credit card, a debit card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. A token may be used as a substitute or replacement identifier for an original account identifier, such as a PAN. Tokens may be associated with a PAN or other original account identifier in one or more data structures (e.g., one or more databases and/or the like) such that they may be used to conduct a transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "POS system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein, the term "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "issuer" may refer to one or more entities that provide one or more accounts (e.g., a credit account, a debit account, a credit card account, a debit card account, and/or the like) to a user (e.g., customer, consumer, and/or the like) for conducting transactions (e.g., payment transactions). For example, an issuer may provide an account identifier, such as a PAN, to a user that uniquely identifies one or more accounts associated with the user. The account identifier may be used by the user to conduct a payment transaction. In some non-limiting embodiments, the account identifier may be embodied on a portable payment device, such as a payment card and/or may be electronic and used for electronic payment transactions. In some non-limiting embodiments, an issuer may be associated with a bank identification number (BIN) that uniquely identifies the issuer. As used herein, the term "issuer system" may refer to one or more systems operated by or operated on behalf of an issuer. For example, an issuer system may refer to a server executing one or more software applications associated with the issuer. In some non-limiting embodiments, an issuer system may include one or more servers (e.g., one or more authorization servers) for authorizing a payment transaction.

As used herein, the term "client device" may refer to one or more devices (e.g., client-side devices) or one or more systems (e.g., client-side systems), which are remote from a server, used to access a functionality provided by the server. For example, a client device may include one or more computing devices (e.g., one or more computing machines, one or more computers, one or more processors, one or more information processing systems, and/or the like), cellular phones, smartphones, wearable devices (e.g., watches, glasses, lenses, clothing, and/or the like), personal digital assistants (PDAs), and/or the like.

As used herein, the term "server" may refer to one or more devices that provide a functionality to one or more devices (e.g., one or more client devices) via a network (e.g., a public network, a private network, the Internet, and/or the like). For example, a server may include one or more computing devices.

As used herein, the term "system" may refer to one or more devices (e.g., a group of devices) that are connected or are configured to be connected with one or more other devices. For example, a system may include a plurality of computing devices that include software applications, where the plurality of computing devices are connected via a network.

In some non-limiting embodiments, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, methods, and computer program products for verifying integrity of a machine learning model. According to non-limiting embodiments of the present disclosure, a machine learning system may determine whether an output of a machine learning model based on an input corresponds to a reference output of the machine learning model based on the input, serialize the machine learning model into a file, calculate a file integrity value of the file using a file integrity detection function, determine whether the file integrity value corresponds to a reference file integrity value of the file, and perform an operation with the machine learning model based on determining that the file integrity value corresponds to the reference file integrity value of the file. In this way, a machine learning system may be able to determine if a machine learning model is corrupt, for example at runtime for the machine learning model. The machine learning system may be able to determine if the machine learning model is corrupt when the machine learning model is stored in main memory of the server. In addition, the machine learning system may be able to determine if the machine learning model is corrupt, and the machine learning system may be able to take an action (e.g., restart the machine learning system, reload the machine learning model, and/or the like) that ensures that a response provided by machine learning system based on an output of the machine learning model does not include information that is incorrect.

Referring now to FIG. 1, FIG. 1 is a diagram of an example environment 100 in which devices, apparatus, systems, computer program products, and/or methods, described herein, may be implemented. As shown in FIG. 1, environment 100 includes machine learning system 102, model management system 104, and communication network 106. Machine learning system 102 and model management system 104 may interconnect (e.g., establish a connection to communicate) via wired connections, wireless connections, or a combination of wired and wireless connections.

Machine learning system 102 may include one or more devices capable of being in communication with model management system 104 via communication network 106. For example, machine learning system 102 may include one or more computing devices, such as a server (e.g., a transaction processing server), a group of servers, and/or other like devices. In some non-limiting embodiments, machine learning system 102 may be associated with a financial institution, a transaction service provider, and/or an issuer as described herein. For example, machine learning system 102 may be operated by a financial institution, a transaction service provider, and/or an issuer.

Model management system 104 may include one or more devices capable of being in communication with machine learning system 102 via communication network 106. For example, model management system 104 may include one or more computing devices, such as a server (e.g., a transaction processing server), a group of servers, and/or other like devices. In some non-limiting embodiments, model management system 104 may be associated with a financial institution, a transaction service provider, and/or an issuer as described herein. For example, model management system 104 may be operated by a financial institution, a transaction service provider, and/or an issuer.

Communication network 106 may include one or more wired and/or wireless networks. For example, communication network 106 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of systems (e.g., one or more devices) and networks shown in FIG. 1 are provided as an example. There may be additional systems and/or networks, fewer systems and/or networks, different systems and/or networks, or differently arranged systems and/or networks than those shown in FIG. 1. Furthermore, two or more systems shown in FIG. 1 may be implemented within a single system, or a single system shown in FIG. 1 may be implemented as multiple, distributed systems. Additionally or alternatively, a set of devices (e.g., one or more devices) of a system shown in FIG. 1 may perform one or more functions described as being performed by another set of devices of another system in environment 100.

Figure 2:
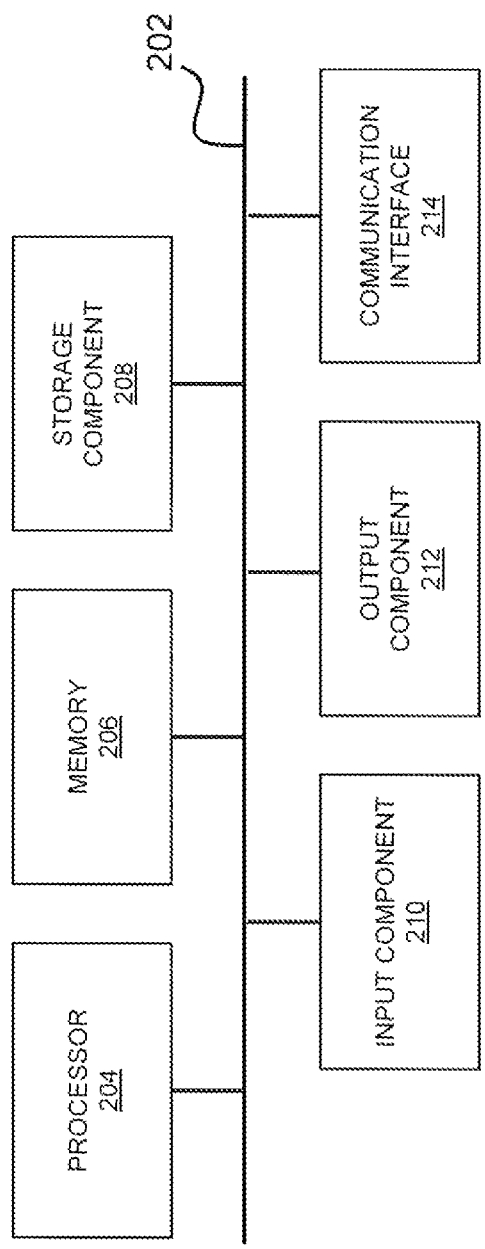
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of machine learning system 102 and/or model management system 104. In some non-limiting embodiments, machine learning system 102 and/or model management system 104 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
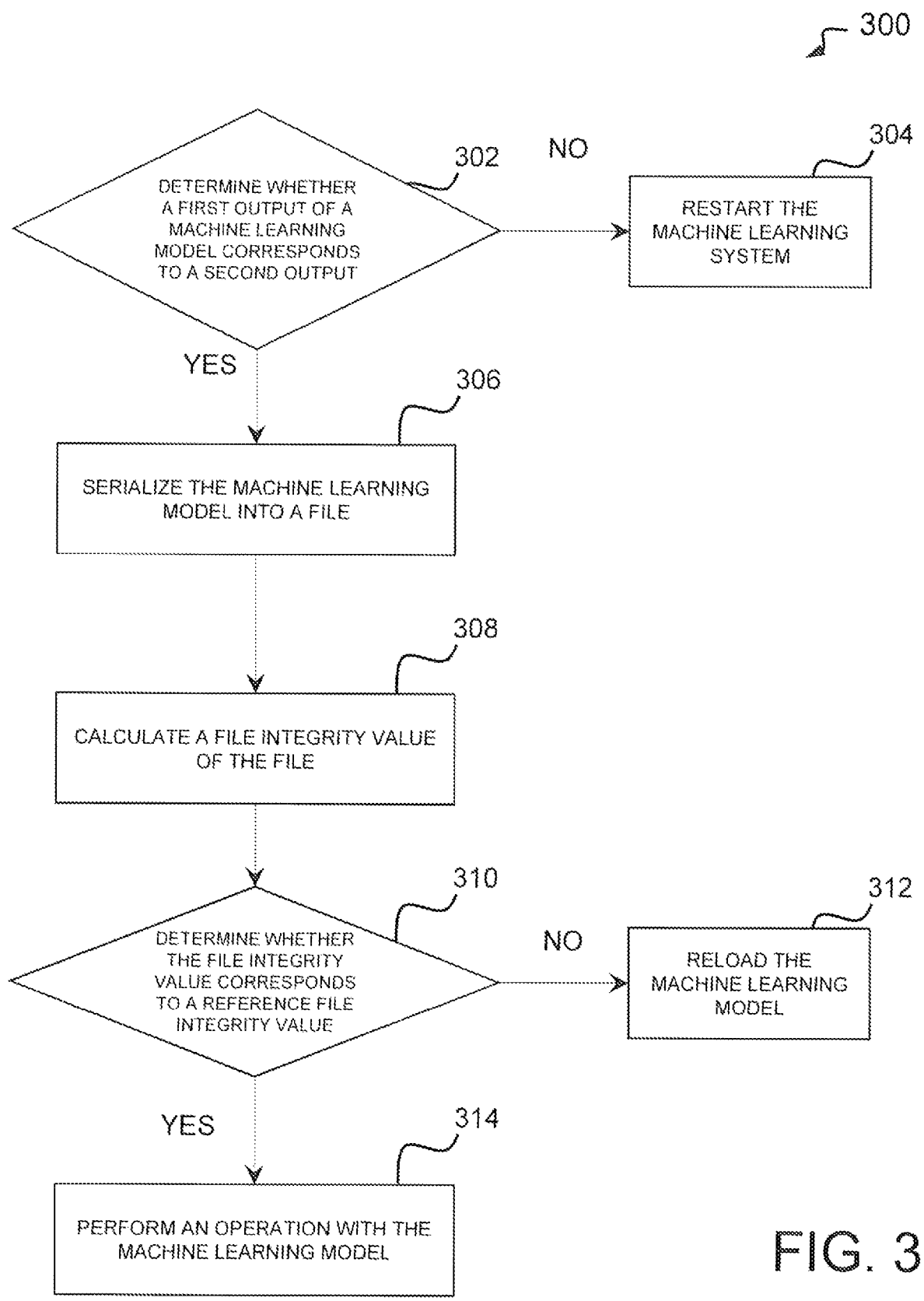
FIG. 3 is a flowchart of a non-limiting embodiment of a process for verifying integrity of a machine learning model.

Referring now to FIG. 3, FIG. 3 is a flowchart of a non-limiting embodiment of a process 300 for verifying integrity of a machine learning model. In some non-limiting embodiments, one or more of the steps of process 300 may be performed (e.g., completely, partially, etc.) by machine learning system 102 (e.g., one or more devices of machine learning system 102). In some non-limiting embodiments, one or more of the steps of process 300 may be performed (e.g., completely, partially, etc.) by another device or a group of devices separate from or including machine learning system 102, such as model management system 104.

As shown in FIG. 3, at step 302, process 300 includes determining whether a first output of a machine learning model corresponds to a second output of the machine learning model. For example, machine learning system 102 may determine whether the first output (e.g., a runtime output) of the machine learning model corresponds to the second output (e.g., a reference output) of the machine learning model. In some non-limiting embodiments, machine learning system 102 may determine whether the first output of the machine learning model corresponds to the second output (e.g., a reference output) of the machine learning model by comparing the first output and the second output. For example, machine learning system 102 may generate the first output of the machine learning model based on a first input and machine learning system 102 may generate the second output of the machine learning model based on the first input. Machine learning system 102 may determine whether the first output corresponds to the second output by comparing the first output and the second output. In some non-limiting embodiments, if machine learning system 102 determines that the first output matches the second output, machine learning system 102 may determine that the first output corresponds to the second output. Additionally or alternatively, if machine learning system 102 determines that the first output does not match the second output, machine learning system 102 may determine that the first output does not correspond to the second output.

In some non-limiting embodiments, machine learning system 102 may determine whether an output of a machine learning model provided during runtime of the machine learning model (e.g., a runtime output of the machine learning model) corresponds to a reference output of the machine learning model. For example, the machine learning model may be loaded into main memory of machine learning system 102 to be used during runtime. An input (e.g., a reference input) may be provided to the machine learning model and the machine learning model may provide the runtime output. The reference output may have been provided by the machine learning model before the machine learning model is to be used during runtime (e.g., prior to loading the machine learning model into main memory). Machine learning system 102 may determine whether the runtime output provided by the machine learning model when the machine learning model is to be used during runtime corresponds to the reference output provided by the machine learning model before the machine learning model is to be used during runtime.

In some non-limiting embodiments, if machine learning system 102 determines that the runtime output matches the reference output, machine learning system 102 may determine that the runtime output corresponds to the reference output. Additionally or alternatively, if machine learning system 102 determines that the runtime output does not match the reference output, machine learning system 102 may determine that the runtime output does not correspond to the reference output.

In some non-limiting embodiments, machine learning system 102 may generate the reference output of the machine learning model based on an input (e.g., a reference input) to the machine learning model. For example, machine learning system 102 may generate the reference output based on an input that includes validation data that was used to train and/or validate the machine learning model. In some non-limiting embodiments, machine learning system 102 may store the reference output of the machine learning model in a data structure. For example, machine learning system 102 may store the reference output of the machine learning model in a data structure associated with machine learning system 102. The data structure may be accessible to machine learning system 102 so that machine learning system 102 may retrieve the reference output of the machine learning model.

In some non-limiting embodiments, machine learning system 102 may generate the runtime output of the machine learning model based on an input to the machine learning model that was the same as the input to the machine learning model used to generate the reference output of the machine learning model. For example, the runtime output of the machine learning model may be based on an input provided to the machine learning model and the reference output of the machine learning model may be based on that input. In some non-limiting embodiments, machine learning system 102 may compare the runtime output to a reference output of the machine learning model to determine whether the runtime output corresponds to the reference output.

In some non-limiting embodiments, machine learning system 102 may generate the runtime output of the machine learning model based on an input (e.g., a reference input) to the machine learning model that was the same as the input to the machine learning model used to generate the reference output of the machine learning model.

In some non-limiting embodiments, machine learning system 102 may receive the machine learning model from model management system 104. For example, model management system 104 may store a plurality of machine learning models in a data structure associated with model management system 104. Model management system 104 may transmit one or more machine learning models to machine learning system 102 based on model management system 104 receiving a request from machine learning system 102 to provide a machine learning model. Machine learning system 102 may receive one or more machine learning models from model management system 104 based on the request from machine learning system 102.

As further shown in FIG. 3, at step 304 (NO), process 300 includes restarting the machine learning system. For example, machine learning system 102 may cause machine learning system 102 to restart based on determining that the output of the machine learning model does not correspond to the reference output of the machine learning model. In some non-limiting embodiments, machine learning system 102 may restart and/or reload the machine learning model based on determining that the output does not correspond to the reference output. For example, machine learning system 102 may restart and/or reload the machine learning model into a main memory of machine learning system 102 based on determining that the output does not correspond to the reference output. In some non-limiting embodiments, machine learning system 102 may determine that the machine learning model and/or the main memory of machine learning system 102 is corrupted based on determining that the output does not correspond to the reference output.

As further shown in FIG. 3, at step 306 (YES), process 300 includes serializing the machine learning model into a file. For example, machine learning system 102 may serialize the machine learning model into a file based on determining that the first output of the machine learning model corresponds to the second output of the machine learning model. In some non-limiting embodiments, machine learning system 102 may serialize the machine learning model into a serialized format and the serialized format may be saved to a file. For example, machine learning system 102 may serialize the machine learning model into the serialized format and save the serialized format to a file based on determining that the first output of the machine learning model corresponds to the second output of the machine learning model. In some non-limiting embodiments, machine learning system 102 may deserialize the file to provide the machine learning model after serializing the file.

As further shown in FIG. 3, at step 308, process 300 includes calculating a file integrity value of the file. For example, machine learning system 102 may calculate a file integrity value (e.g., a runtime file integrity value) of the file based on serializing the machine learning model into the file. In some non-limiting embodiments, machine learning system 102 may calculate the file integrity value of the file using a file integrity detection function. In some non-limiting embodiments, the file integrity detection function may include a hash function (e.g., a cryptographic hash function, such as an MD5 function, an SHA function, and/or the like), a checksum function, a fingerprinting function (e.g., a fingerprinting algorithm), cyclic redundancy check (CRC) function, and/or the like. In some non-limiting embodiments, the file integrity value (e.g., a runtime file integrity value and/or a reference file integrity value) may include an output of the file integrity detection function. For example, the file integrity value may include a hash value, a checksum value, a fingerprint, a CRC value, and/or the like.

In some non-limiting embodiments, machine learning system 102 may calculate a file integrity value of a file during runtime for the machine learning model. For example, machine learning system 102 may load a machine learning model into main memory and serialize the machine learning model into a file. In such an example, machine learning system 102 may calculate a file integrity value of a file of the machine learning model after serializing the machine learning model into the file.

In some non-limiting embodiments, machine learning system 102 may generate a reference file integrity value of the file using the file integrity detection function prior to runtime for the machine learning model. For example, machine learning system 102 may generate the reference file integrity value of the file using the file integrity detection function before the machine learning model is loaded into main memory. In some non-limiting embodiments, machine learning system 102 may store the reference file integrity value of the file in a data structure. For example, machine learning system 102 may store the reference file integrity value of the file in a data structure associated with machine learning system 102 based on generating the reference file integrity value.

As further shown in FIG. 3, at step 310, process 300 includes determining whether the file integrity value corresponds to a reference file integrity value of the file. For example, machine learning system 102 may determine whether the file integrity value (e.g., the runtime file integrity value) corresponds to the reference file integrity value of the file. In some non-limiting embodiments, if machine learning system 102 determines that the reference file integrity value matches the reference file integrity value, machine learning system 102 may determine that the file integrity value corresponds to the reference file integrity value. Additionally or alternatively, if machine learning system 102 determines that the runtime file integrity value does not match the reference file integrity value, machine learning system 102 may determine that the file integrity value does not correspond to the reference file integrity value.

In some non-limiting embodiments, machine learning system 102 may determine whether the file integrity value corresponds to the reference file integrity value of the file before or after determining whether an output of the machine learning model based on an input corresponds to a reference output of the machine learning model based on the input. For example, machine learning system 102 may determine whether the file integrity value corresponds to the reference file integrity value of the file based on determining that the output of the machine learning model based on the input corresponds to the reference output of the machine learning model based on the input.

In some non-limiting embodiments, machine learning system 102 may deserialize the file to provide the machine learning model after serializing the file. For example, machine learning system 102 may deserialize the file to provide the machine learning model based on determining that the file integrity value corresponds to the reference file integrity value of the file.

In some non-limiting embodiments, machine learning system 102 may use the machine learning model to provide a runtime output. For example, use the machine learning model to provide a runtime output (e.g., a second runtime output) based on determining that the file integrity value corresponds to a reference file integrity value of the file.

As further shown in FIG. 3, at step 312 (NO), process 300 includes reloading the machine learning model. For example, machine learning system 102 may reload the machine learning model into main memory based on determining that the file integrity value does not correspond to the reference file integrity value of the file.

In some non-limiting embodiments, machine learning system 102 may restart and/or reload the machine learning model based on determining that the file integrity value does not correspond to the reference file integrity value of the file. For example, machine learning system 102 may cause machine learning system 102 to restart and/or reload the machine learning model into a main memory of machine learning system 102 based on determining that the file integrity value does not correspond to the reference file integrity value of the file. In some non-limiting embodiments, machine learning system 102 may determine that the machine learning model and/or the main memory of machine learning system 102 is corrupted based on determining that the file integrity value does not correspond to the reference file integrity value of the file.

In some non-limiting embodiments, machine learning system 102 may transfer a machine learning model from a first device of machine learning system 102 to a second device of machine learning system 102. For example, machine learning system 102 may transfer a machine learning model from a first device (e.g., a first computing device, a first server, and/or the like) to a second device (e.g., a second computing device, a second server, and/or the like) based on determining that the file integrity value does not correspond to the reference file integrity value of the file. In another example, machine learning system 102 may transfer a machine learning model from a first device to a second device based on determining that an output (e.g., a runtime output) of the machine learning model does not correspond to the reference output of the machine learning model.

As further shown in FIG. 3, at step 314 (YES), process 300 includes performing an operation with the machine learning model. For example, machine learning system 102 may perform an operation with the machine learning model based on determining that the file integrity value corresponds to a reference file integrity value of the file. In some non-limiting embodiments, machine learning system 102 may perform an operation associated with the machine learning model such as determining whether a payment transaction should be classified as fraudulent, determining whether an account identifier involved in a payment transaction is associated with a profile of a user involved in the payment transaction, determining a score (e.g., a fraud score) for a payment transaction, determining a score (e.g., a fraud score) for an account associated with an account identifier involved in a payment transaction, and/or the like.

In some non-limiting embodiments, machine learning system 102 may perform an operation with the machine learning model based on a request for the operation. For example, machine learning system 102 may receive the request for the operation and machine learning system 102 may perform the operation after determining that the file integrity value corresponds to a reference file integrity value of the file and/or after determining that an output of the machine learning model based on an input corresponds to a reference output of the machine learning model based on the input.

FIGS. 4A-4F are diagrams of an overview of a non-limiting embodiment of an implementation 400 relating to a process for verifying integrity of a machine learning model. As shown in FIGS. 4A-4F, implementation 400 may include machine learning system 402 and model management system 404. In some non-limiting embodiments, machine learning system 402 may be the same or similar to machine learning system 102 and/or model management system 404 may be the same or similar to model management system 104.

As shown by reference number 410 in FIG. 4A, machine learning system 402 may generate a reference output with a machine learning model. For example, in some non-limiting embodiments, machine learning system 402 may generate a reference output with a machine learning model based on a reference input. In some non-limiting embodiments, machine learning system 402 may generate the reference output based on receiving the machine learning model. For example, machine learning system 402 may generate the reference output based on receiving the machine learning model from model management system 404. In some non-limiting embodiments, machine learning system 402 may store the reference output in main memory of machine learning system 402.

As shown by reference number 415 in FIG. 4B, machine learning system 402 may load the machine learning model into main memory. For example, machine learning system 402 may load the machine learning model into main memory based on receiving the machine learning model from model management system 404.

As shown by reference number 420, machine learning system 402 may generate a runtime output. For example, machine learning system 402 may generate a runtime output by inputting the reference input into the machine learning model, thereby causing the machine learning model to output the runtime output. In such an example, machine learning system 402 may generate the runtime output at a point in time later than the point in time the reference output is generated (e.g., one hour later, one day later, one week later, and/or the like from the point in time the reference output was generated). In some non-limiting embodiments, machine learning system 402 may store the runtime output in main memory of machine learning system 402.

As shown by reference number 425 in FIG. 4C, machine learning system 402 may compare the reference output to the runtime output. As shown by reference number 430 in FIG. 4C, machine learning system 402 may determine that the reference output corresponds to the runtime output. For example, machine learning system 402 may determine that the reference output corresponds to the runtime output based on comparing the reference output to the runtime output. Additionally, or alternatively, in some non-limiting embodiments, machine learning system 402 may determine that the reference output corresponds to the runtime output based on determining that the reference output and the runtime output were generated based on the same reference input. In such an example, machine learning system 402 may determine the reference output and the runtime output match by comparing the reference output to the runtime output.

As shown by reference number 435 in FIG. 4D, machine learning system 402 may serialize the machine learning model into a file. For example, machine learning system 402 may serialize the machine learning model based on determining that the reference output corresponds to the runtime output. As shown by reference number 440, machine learning system 402 may generate a hash value. For example, machine learning system 402 may generate a hash value based on the file generated by serializing the machine learning model.

Figure 4E:
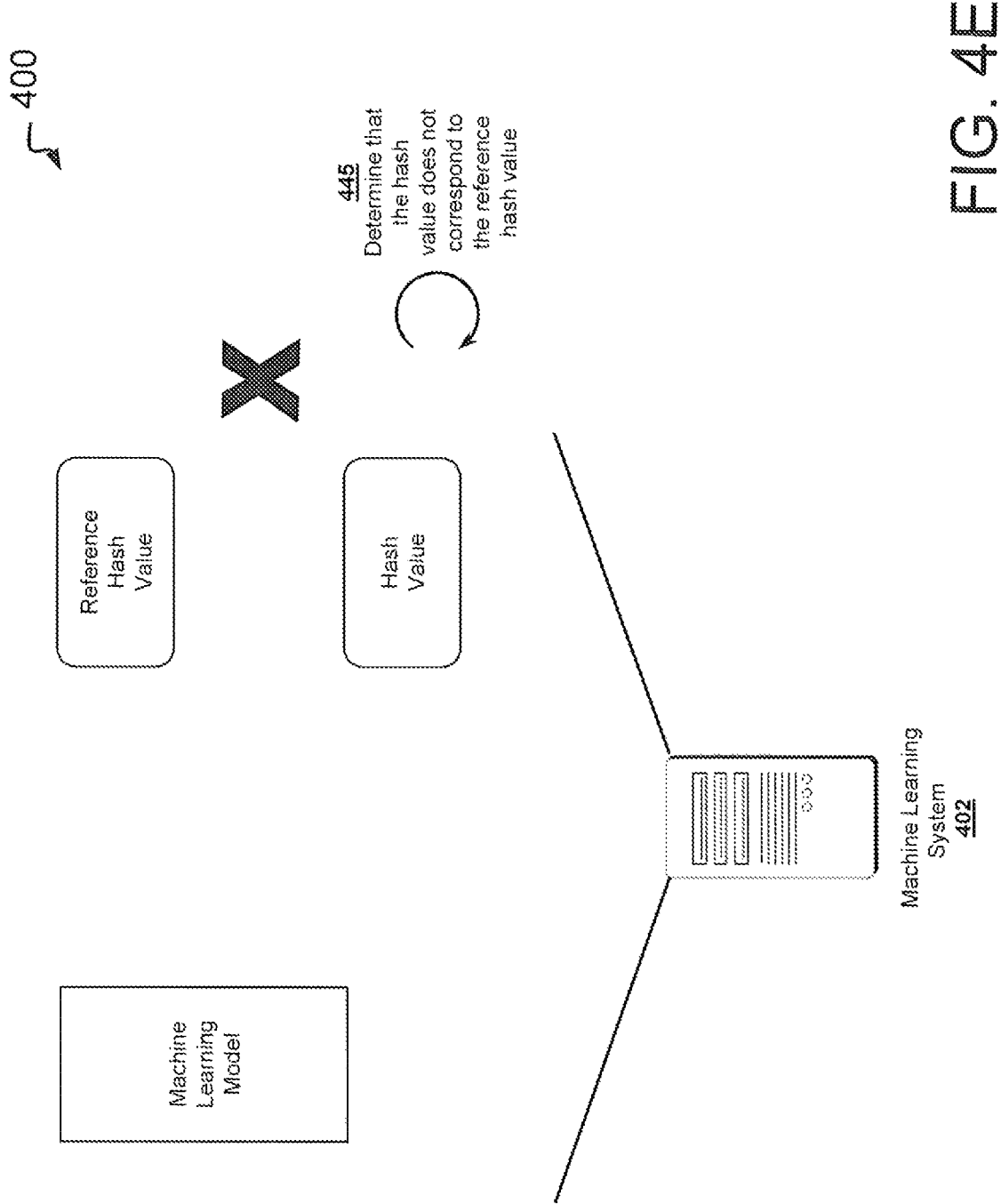

As shown by reference number 445 in FIG. 4E, machine learning system 402 may determine that the runtime hash value does not correspond to a reference hash value. As shown by reference number 450 in FIG. 4F, machine learning system 402 may receive the machine learning model. For example, machine learning system 402 may receive the machine learning model based on transmitting a request for data associated with the machine learning model. In such an example, machine learning system 402 may transmit the request for data associated with the machine learning model to model management system 404.

Figure 4F:
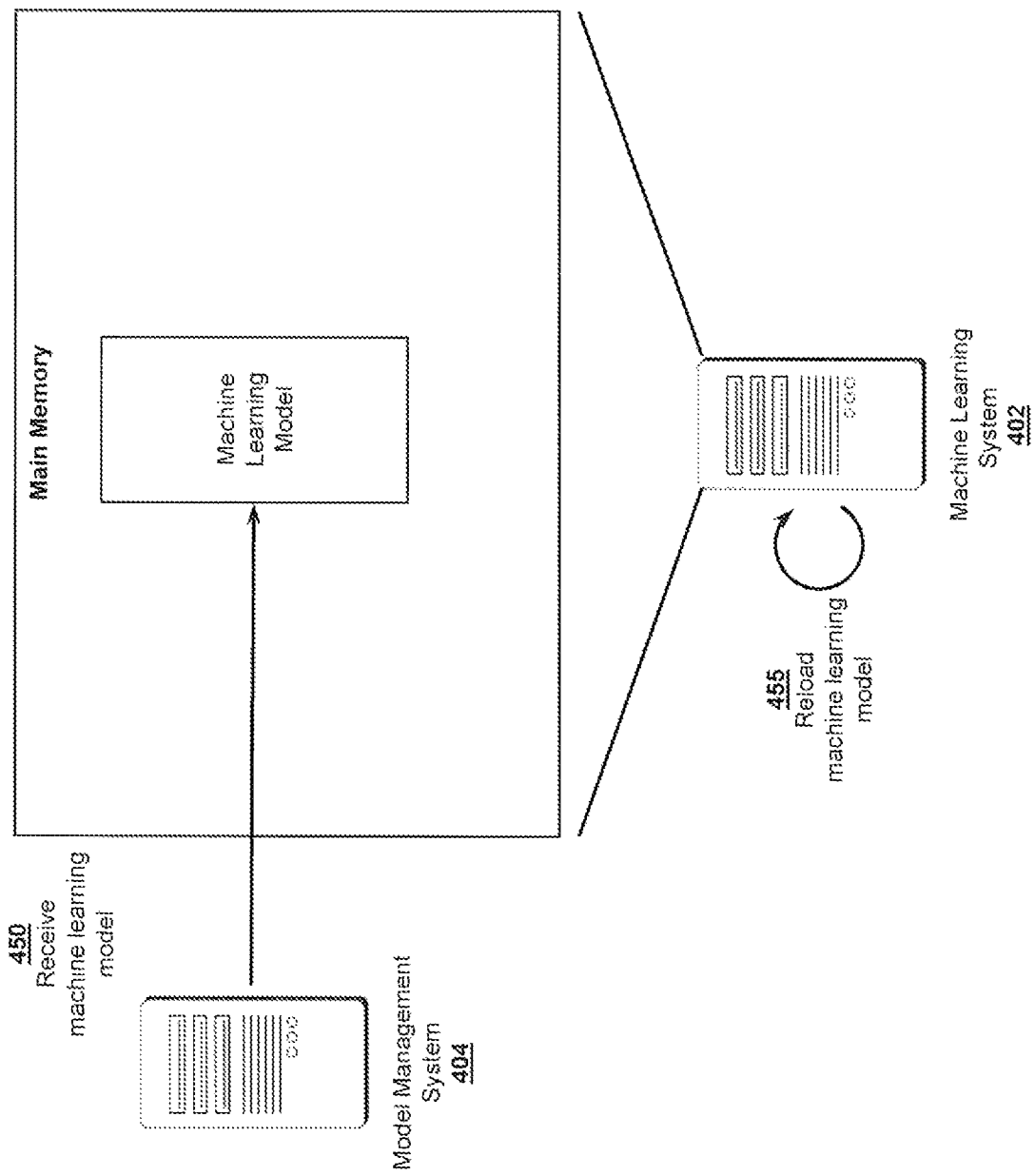

As shown by reference number 455 in FIG. 4F, machine learning system may reload the machine learning model. For example, in some non-limiting embodiments, machine learning system 402 may reload the machine learning model into memory of machine learning system 402. In some non-limiting embodiments, machine learning system 402 may reload the machine learning model into memory of machine learning system 402 based on receiving data associated with the machine learning model from model management system 404.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements. For example, it is to be understood that the present disclosure contemplates that, to the extent possible, one or more aspects of any embodiment can be combined with one or more aspects of any other embodiment.

What is claimed is:

1. A system for verifying integrity of a machine learning model, the system comprising:
at least one processor programmed or configured to:

generate a reference output of a machine learning model based on an input to the machine learning model;
store the reference output of the machine learning model in a database;
generate a second output of the machine learning model based on the input to the machine learning model;
retrieve the reference output of the machine learning model from the database;
determine whether the second output of the machine learning model matches the reference output of the machine learning model;
load the machine learning model into a main memory before determining whether the second output of the machine learning model matches the reference output of the machine learning model;
serialize the machine learning model into a serialized format based on determining that the second output of the machine learning model matches the reference output of the machine learning model;
save the machine learning model in the serialized format to a file based on serializing the machine learning model into the serialized format;
calculate a file integrity value of the file using a file integrity detection function;
determine whether the file integrity value matches a reference file integrity value of the file;
deserialize the file to provide the machine learning model based on determining that the file integrity value matches the reference file integrity value of the file;
perform an operation with the machine learning model based on deserializing the file; and
use the machine learning model to produce a runtime output based on determining that the file integrity value matches a reference file integrity value of the file.

2. The system of claim 1, wherein the file integrity detection function is a hash function and wherein, when calculating the reference file integrity value of the file using the file integrity detection function, the at least one processor is programmed or configured to:
calculate a hash value of the file using the hash function; and
wherein, when determining whether the file integrity value matches the reference file integrity value of the file, the at least one processor is programmed or configured to:
determine whether the hash value of the file matches a reference hash value of the file.

3. The system of claim 1, wherein the at least one processor is programmed or configured to:
generate the reference file integrity value of the file using the file integrity detection function; and
store the reference file integrity value of the file in the database.

4. A computer-implemented method for verifying integrity of a machine learning model, the method comprising:
generating, with at least one processor, a reference output of a machine learning model based on a reference input to the machine learning model;
storing, with at least one processor, the reference output of the machine learning model in a database;
generating, with at least one processor, a second output of the machine learning model based on the reference input to the machine learning model;
retrieving, with at least one processor, the reference output of the machine learning model from the database;
determining, with at least one processor, that the second output of the machine learning model matches the reference output of the machine learning model;
loading, with at least one processor, the machine learning model into a main memory before determining whether the second output of the machine learning model matches the reference output of the machine learning model;
serializing, with at least one processor, the machine learning model into a serialized format based on determining that the second output of the machine learning model matches the reference output of the machine learning model;
saving, with at least one processor, the machine learning model in the serialized format to a file based on serializing the machine learning model into the serialized format;
calculating, with at least one processor, a file integrity value of the file using a file integrity detection function;
determining, with at least one processor, that the file integrity value matches a reference file integrity value of the file;
deserializing, with at least one processor, the file to provide the machine learning model based on determining that the file integrity value matches the reference file integrity value of the file;
performing, with at least one processor, an operation with the machine learning model based on deserializing the file; and
using the machine learning model to produce a runtime output based on determining that the file integrity value matches a reference file integrity value of the file.

5. The computer-implemented method of claim 4, wherein the file integrity detection function is a hash function and wherein calculating, with at least one processor, the reference file integrity value of the file using the file integrity detection function comprises:
calculating, with at least one processor, a hash value of the file using the hash function; and
wherein determining, with at least one processor, whether the file integrity value matches the reference file integrity value of the file comprises:
determining, with at least one processor, whether the hash value of the file matches a reference hash value of the file.

6. The computer-implemented method of claim 4, further comprising:
generating, with at least one processor, the reference file integrity value of the file using the file integrity detection function; and
storing, with at least one processor, the reference file integrity value of the file in the database.

7. A computer program product for verifying integrity of a machine learning model, the computer program product comprising at least one non-transitory computer-readable medium including one or more instructions that, when executed by at least one processor, cause the at least one processor to:
generate a reference output of a machine learning model based on a reference input to the machine learning model;
store the reference output of the machine learning model in a database;

generate a runtime output of the machine learning model based on the reference input to the machine learning model;
retrieve the reference output of the machine learning model from the database;
determine whether the runtime output of the machine learning model matches the reference output of the machine learning model;
load the machine learning model into a main memory before determining whether the runtime output of the machine learning model matches the reference output of the machine learning model;
serialize the machine learning model into a serialized format based on determining that the runtime output of the machine learning model matches the reference output of the machine learning model;
save the machine learning model in the serialized format to a file based on serializing the machine learning model into the serialized format;
calculate a file integrity value of the file using a file integrity detection function;
determine whether the file integrity value matches a reference file integrity value of the file;
deserialize the file to provide the machine learning model based on determining that the file integrity value matches the reference file integrity value of the file; and
perform an operation with the machine learning model based on deserializing the file,
wherein the runtime output is a first runtime output, and wherein the one or more instructions further cause the at least one processor to:
use the machine learning model to provide a second runtime output based on determining that the file integrity value matches a reference file integrity value of the file.

8. The computer program product of claim 7, wherein the file integrity detection function is a hash function and wherein the one or more instructions that cause the at least one processor to calculate the reference file integrity value of the file using the file integrity detection function cause the at least one processor to:
calculate, with at least one processor, a hash value of the file using the hash function; and
wherein the one or more instructions that cause the at least one processor to determine whether the file integrity value matches the reference file integrity value of the file cause the at least one processor to:
determine whether the hash value of the file matches a reference hash value of the file.

9. The computer program product of claim 7, wherein the one or more instructions further cause the at least one processor to:
generate the reference file integrity value of the file using the file integrity detection function; and
store the reference file integrity value of the file in the database.

* * * * *